United States Patent [19]

Sawada et al.

[11] Patent Number: 4,593,582
[45] Date of Patent: Jun. 10, 1986

[54] CONTINUOUSLY VARIABLE TRANSMISSION MEANS FOR USE IN VEHICLES

[75] Inventors: Daisaku Sawada, Gotenba; Takashi Shigematu; Setsuo Tokoro, both of Susono, all of Japan

[73] Assignee: Toyota Jidosha Kabushiki Kaisha, Aichi, Japan

[21] Appl. No.: 541,249

[22] Filed: Oct. 12, 1983

[30] Foreign Application Priority Data

Oct. 15, 1982 [JP] Japan .................................. 57-179862

[51] Int. Cl.[4] ............................................ B60K 41/16
[52] U.S. Cl. ........................................ 74/866; 74/863; 74/864; 74/865; 364/424.1
[58] Field of Search ................. 74/844, 856, 857, 866, 74/859, 860, 861, 863, 864, 865; 474/11, 12, 17, 18, 28; 364/424.1

[56] References Cited

U.S. PATENT DOCUMENTS

| | | | |
|---|---|---|---|
| 4,387,608 | 6/1983 | Mohl et al. | 474/12 X |
| 4,438,664 | 3/1984 | Fiala | 74/857 X |
| 4,458,318 | 7/1984 | Smit et al. | 474/28 X |
| 4,458,560 | 7/1984 | Frank et al. | 74/857 |
| 4,462,275 | 7/1984 | Mohl et al. | 474/12 X |
| 4,466,311 | 8/1984 | Hiramatsu | 74/866 |
| 4,466,521 | 8/1984 | Hattori et al. | 74/866 X |

FOREIGN PATENT DOCUMENTS

| | | | |
|---|---|---|---|
| 55-31671 | 3/1980 | Japan | 74/856 |
| 56-46152 | 4/1981 | Japan. | |
| 56-46153 | 4/1981 | Japan. | |
| 56-66553 | 6/1981 | Japan. | |

Primary Examiner—William F. Pate, III
Assistant Examiner—Dwight G. Diehl
Attorney, Agent, or Firm—Parkhurst & Oliff

[57] ABSTRACT

A continuously variable transmission means for vehicles which enables the engine speed under a high torque to be as small as possible, while ameliorating undesirable noise in a passenger compartment. The transmission means includes a device for detecting a noise and a comparator device for comparing the actual booming noise with a predetermined allowable noise level.

4 Claims, 6 Drawing Figures

CONTINUOUSLY VARIABLE TRANSMISSION MEANS FOR USE IN VEHICLES

BACKGROUND OF THE INVENTION

The present invention relates to a continuously variable transmission means for use in a vehicle. The continuously variable transmission (CVT) varies transmitting speed ratios of a revolution number of a driven pulley to that of a driving pulley. More particularly, the present invention relates to a transmission means having a control means which permits a low engine RPM, even when an engine experiences a large load.

FIG. 1 shows a graph illustating a relationship between an engine torque and an engine speed (RPM) of a vehicle in which a continuously variable transmission means is mounted. Heretofore, the RPM of an engine equipped with a CVT was designed such that it assumed a value determined by the curves "a" and "b" in FIG. 1. It is preferable that an engine RPM is determined so that the amount of fuel consumption be minimized over the entire range. The curve "a" is shown in FIG. 1 determined such that the amount of fuel consumed may be minimized. On the other hand, in general, vibrations in the engine increase when the engine is at a low RPM, while experiencing a high load. This results in the occurrence of undesirable vibration in a vehicle body, and noise in a passenger compartment. Further, this vibration shortens the endurance of driving parts employed in a vehicle. It is quite difficult to determine an engine RPM especially under the condition that an engine RPM is low and an engine load is high. Hence, an engine RPM must be varied from an engine speed curve, indicated by the reference "a", to an another engine speed curve indicated by a reference "b", during the time when engine RPM is low. A point D1 on the curve "a" is a point where the curve "a" intersects with the curve "b". The curve "b" is determined independently from the minimum fuel consumption curve "a" as shown in FIG. 1. The preferable engine characteristics at a low engine RPM under a high engine load varies according to the type of engine mounting structure to a vehicle body, the vehicle body structure and the engine operating conditions. Hence, in order to obviate the above-mentioned drawbacks the engine characteristic curve at a low engine speed is determined by the curve "b", which is located at relatively higher engine RPM's than that of the curve "c". This results in a large amount of a gasoline consumption and impairs efficient operation.

SUMMARY OF THE INVENTION

The present invention was made in view of the foregoing background and to overcome the foregoing drawbacks. It is an object of this invention to provide a continuously variable transmission means which permits a low engine RPM even when a high load is applied to an engine.

To attain the above object, a continuously variable transmission according to the present invention, has a driving pulley with a fixed member and a movable member actuated by a hydraulic cylinder to form a V-shaped opening therebetween, a driven pulley with another fixed member and another movable member actuated by another hydraulic cylinder to form another V-shaped opening therebetween, and a flexible endless belt member spanning the pulleys so that different transmitting ratios can be obtained. A throttle valve controls an engine speed. A vehicle body vibration in accordance with an operating condition of the engine is detected by a vibration sensor. A storing circuit stores a predetermined basic value, and a comparator compares the detected physical quantity with the stored basic value. Finally, a compensator amends the engine speed from the compared results of the comparator and varies the transmitting ratios from the driving pulley to the driven pulley.

BRIEF DESCRIPTION OF THE DRAWINGS

The above objects, features and advantages of the present invention will become more apparent from the following description of the preferred embodiment taken in conjunction with the accompanying drawings.

DETAILED DESCRIPTION OF THE PREFERRED EMBODIMENT

The present invention is described in detail with reference to the accompanying drawings which illustrate different embodiments of the present invention.

Figure 2:
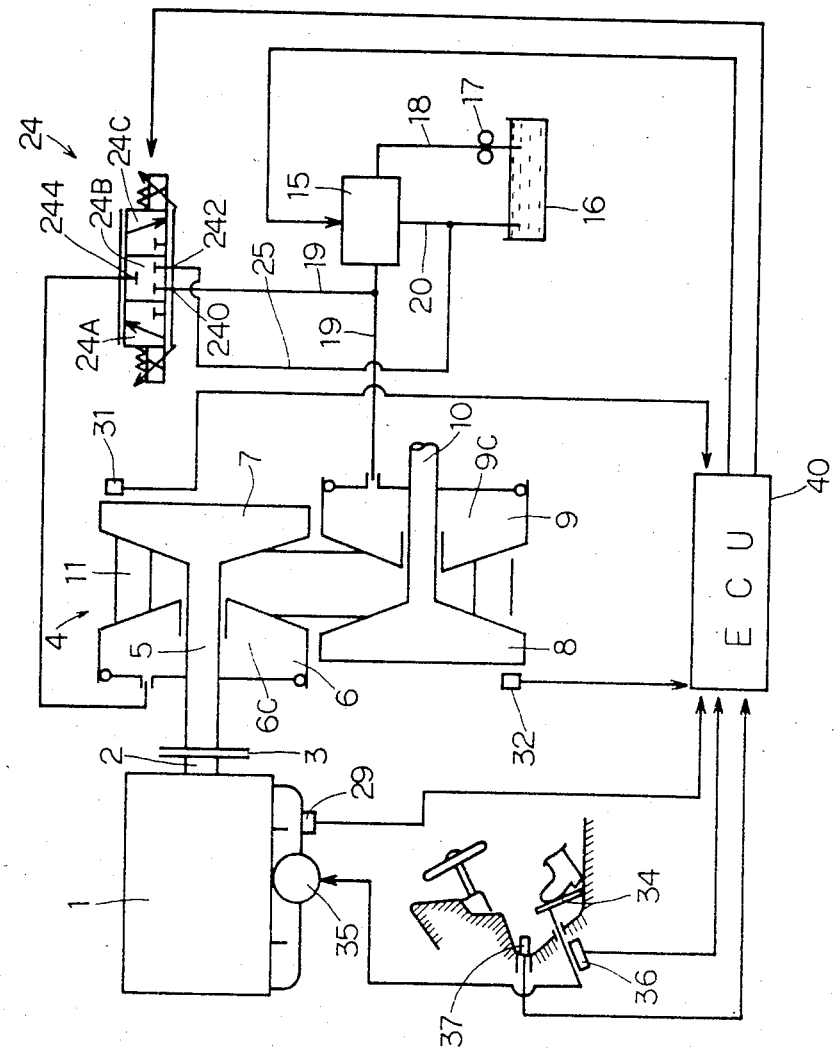
FIG. 2 is a schematic view of a vehicle in which a continuously variable transmission according to the present invention is applied.

FIG. 2 shows a schematic view of a vehicle in which a continuously variable transmission according to the present invention is applied.

An engine 1 generates a torque, and the torque is transmitted through a crank shaft 2 and a clutch 3 to an input shaft 5 of a continuously variable transmission (CVT) 4. The CVT 4 varies the transmitting ratios from the input shaft 5 to an output shaft 10. The continuously variable transmission 4 includes a plurality of pulleys 6, 7 and 8, 9. The pulley 6 and 7 is a driving pulley (input pulley) mounted on the driving and input shaft 5, which is driven by the engine 1. The pulley 8 and 9 is a driven pulley (output pulley) mounted on the driven and output shaft 10. The torque of the output shaft 10 is transmitted to wheels (not shown in drawings). A torque transmitting V-belt 11 extends between V-shaped peripheral portions of the pulleys 6, 7 and 8, 9. The driving pulley has a member 7 which is fixed to and rotatable with the input shaft 5, and a member 6 which is axially displaceable on and rotatable with the input shaft 5. The member 6 is designed to be axially moved by the pressure of a hydraulic cylinder 6c. When the member 6 axially moves in the direction to approach to the opposite member 7, the width defined between the members 6 and 7 can be narrowed. This results in the increase in the effective diameter of the driving pulley. In this condition, the transmitting speed ratio, (the rotating speed of the driven pulley)/(the rotating speed of the driving pulley) increases. Similarly, the driven pulley has a member 8 which is fixed to and rotatable with the driven shaft 10, and a member 9 which is axially displaceable on and rotatable with the driven shaft 10. The member 9 is designed to be axially moved by the pressure of another hydraulic cylinder 9c. When the member 9 axially moves in the direction to approach to the opposite member 8, the width defined between the members 8 and 9 can be narrowed, thereby increasing the effective diameter of the driven pulley. In order to minimize an amount of power loss consumed by an oil pump, the hydraulic pressure of the cylinder 9c is controlled to be as small as possible while keeping to the slip-free torque transfer between the driven pulley 8, 9 and the belt 11. The hydraulic pressure of the cylinder 6c of the driving pulley is controlled in order to vary the transmitting speed ratios between the driving and driven pulleys. The value of the pressure in the cylinder 6c is adapted to be smaller than that of the pressure in the cylinder 9c of the driven pulley. However, as the total square of the cylinder 6c is designed to be bigger than that of the cylinder 9c, it is possible to obtain the speed ratio which is less than one. The continuously variable transmission is supplied with a pressurized fluid in the following procedure:

An oil pump 17 driven by a motor supplies oil in a reservoir 16 to a passage 18. A regulator valve 15 controls the pressure of the fluid in a passage 19, thereby generating a line pressure $P_L$ in the passage 19. The line pressure $P_L$ is supplied through the passage 19 to the cylinder 9c of the driven pulley and to a flow control valve 24. The flow control valve 24 is a three port connection valve, and includes an inlet port 240 communicated through the passage 19 with the regulator valve 15, a drain port 242 communicated with a drain passage 25 and an outlet port 244 communicated with the cylinder 6c of the driving pulley. When the flow control valve 24 is in the first position 24A, the inlet port 240 communicates with the outlet port 244. Next, when the flow control valve 24 is in the second position 24B, there is no communication among three ports 240, 242 and 244 as shown in FIG. 2. Finally, when the flow control valve 24 is in the third position 24C, the outlet port 244 communicates with the drain port 242. The numeral 29, which is attached to a component adjacent the engine 1, designates a sensor for detecting an intake pressure in an intake pipe. Sensors 31 and 32 detect a rotating speed of each of the pulleys and are provided on the driving pulley 6, 7 and the driven pulley 8, 9, respectively. The numeral 34 designates an accelerator pedal in a passenger compartment, and the accelerator pedal 34 is connected with a throttle valve 35 mounted in an intake system. A sensor 36 detects the displaced stroke of the accelerator pedal 34. A sensor 37 for detecting either the sound in a vehicle or vibrations of a vehicle body is provided at a position over the accelerator pedal 34 in a dash panel, detects noise which occurs when the engine speed is low and the engine load is high. The output signals of the sensors 29, 31, 32 and 36, and the sensor 37 are inputted into an electronic control unit (hereinafter referred to as ECU) 40. The ECU 40 outputs the control signals to the valves 15 and 24.

Figure 3:
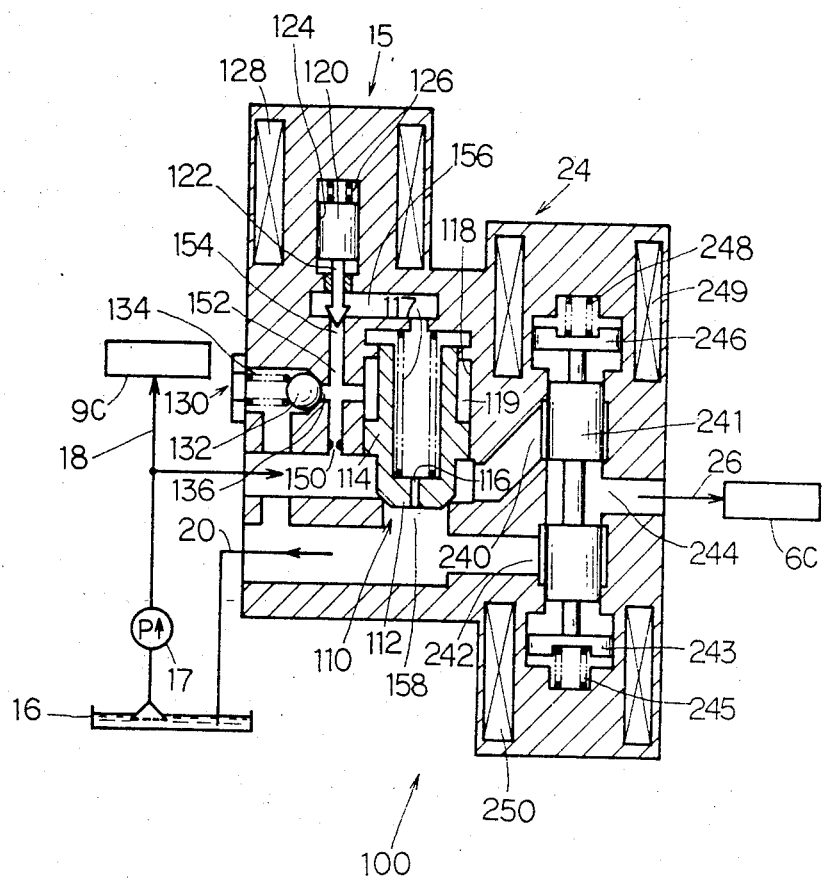
FIG. 3 is an enlarged detailed view of a hydraulic circuit employed in the continuously variable transmission shown in FIG. 2.

Referring next to FIG. 3, there is illustrated the detailed construction of the regulator valve 15 and the flow control valve 24 which are schematically shown in FIG. 2. In this embodiment, both valves 15 and 24 are provided in the same valve body 100. The regulator valve 15 includes a valve spool 110, a Poppet shaped valve member 122 and a relief valve 130. The valve spool 110 slides in a bore 118, thereby opening or closing a port 158, which is defined between the passage 18 and a drain passage 20. The valve spool 110 includes a radially extending portion 114 and a head portion 112. Within the head portion 112, a small hole 116 is provided. There is provided a chamber 119 in a space defined between the portion 114 and the inner wall of the valve body 100. A compression coil spring 117 is located between the head portion 112 of the valve spool 110 and the inner wall of the valve body 100. The spring 117 biases the valve spool 110 toward the direction to close the port 158. The Poppet shaped valve member 122 controls the flow at a port 154 which connects a passage 152 with an oil chamber 156. A plunger 120 is fixed to the Poppet shaped valve member 122, and slides in a bore 124. A compression coil spring 126 is provided at the position between the plunger 120 and the inner wall of the valve body 100. The spring 126 biases the valve member 122 toward the direction to close the port 154. A first linear solenoid 128 is embedded around the plunger 120 in the valve body 100. An orifice 150 is provided on the passage 152, which communicates with the passage 18. The relief valve 130 comprises a check ball 132 and a spring 134 which biases the check ball 132 toward the direction to close a port 136. When the fluid pressure in the chamber 119 exceeds a predetermined value, the check ball 132 moves against the force of the spring 134. Under this condition, oil returns through the port 136 to the passage 18.

The flow control valve 24 is provided at a position between the regulator valve 15 and the hydraulic cylinder 6c of the driving pulley. The flow control valve 24 includes a valve spool 241, plungers 246 and 243, a second solenoid 249 and a third solenoid 250. The valve spool 241 controls the communication among ports 240, 242 and 244. Plungers 246 and 243 are fixed to each end of the valve spool 241, respectively. A compression spring 248 biases the plunger 246 toward the direction to open the drain port 242. A compression spring 245, which is provided at the opposite position to that of the spring 248, biases the plunger 243 toward the direction to close the drain port 242. Further, the second solenoid 249 is provided around the plunger 246 in the valve body 100. When the second solenoid 249 turns on, the second solenoid 249 pulls the plunger 246 with the electromagnetic force against the force of the spring 248. The third solenoid 250 is provided around the plunger 243 in the valve body 100. When the third solenoid 250 turns on, the third solenoid 250 pulls the plunger 243 with the electromagnetic force against the force of the spring 245.

In operation, after the engine starts, the oil pump 17 supplies the oil in the reservoir 16 to the passage 18. When the electric current fed into the first solenoid 128 increases, the first solenoid 128 pulls the plunger 120 against the force of the spring 126. Hence, the top end of the valve member 122 lifts up, and the opening area of the port 154 increases. As the chamber 156 is communicated through the small hole 116 with the drain passage 20, the amount of the drained oil also increases when the opening area of the port 154 increases. Under this condition, the value of the oil pressure in the chamber 119 decreases. When the force biasing the valve spool 110 toward the direction to close the port 158 becomes smaller than that of the force biasing the valve spool 110 toward the direction to open the port 158, in FIG. 3, the valve spool 110 upwardly moves to open the port 158. As a result, the line pressure $P_L$ of the passage 18 decreases.

When the electric current fed into the second and third solenoids 249 and 250 is not zero, the valve spool 241 of the flow control valve 24 positions the neutral point as shown in FIG. 3 (i.e., the second position 24B in FIG. 2). Under this condition, there exists on oil flow communication among ports 240, 242 and 244. When only the second solenoid 249 is supplied with electric current, the second solenoid 249 pulls the plunger 246 against the force of the spring 248. The opening square of the inlet port 240 increases in accordance with the increase of the electric current. Hence, the volume of the oil supplied to the cylinder 6c of the driving pulley increases. This results in the increase of the transmitting speed ratios. Contrary to this, when only the third solenoid 250 is supplied with electric current, the third solenoid 250 pulls the plunger 243 against the force of the spring 245. Under this condition, the opening square of the drain port 242 increases, and this results in an increase of the volume of oil drained from the cylinder 6c of the driving pulley. Hence, the transmitting speed ratio decreases. Thus, the speed ratios are controlled by varying the volume of oil supplied to or drained from the cylinder 6c of the driving pulley.

Figure 4:
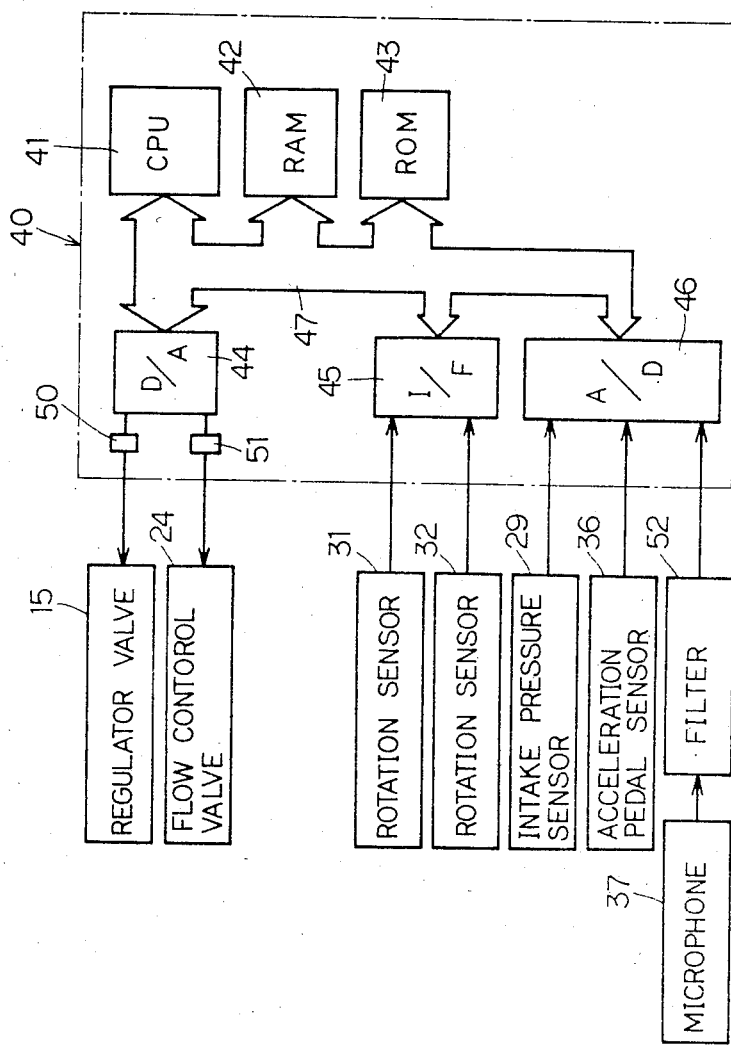
FIG. 4 is a block diagram of an electronic control apparatus employed in the continuously variable transmission according to the present invention.

The ECU 40 controls the regulator valve 15 and the flow control valve 24 by the signals detected by the different types of sensors. FIG. 4 shows that the ECU 40 functions as a digital computer and has a central processing unit (hereinafter referred to as CPU) 41 which carries out the arithmetic and logic processing means, a random-access memory (hereinafter referred to as RAM) 42 which temporarily stores the calculated data of the CPU 41, a read-only memory (hereinafter referred to as ROM) 43 which stores a predetermined control program and arithmetic constants therein, a digital-analog converter (hereinafter referred to as D/A) 44, an inter-face (hereinafter referred to as I/F) 45, and an analog-digital converter (hereinafter referred to as A/D) 46.

The I/F 45 receives the output signals of the sensors 31 and 32 for detecting the rotating speed of the driving pulley and the driven pulley, respectively. The A/D 46 receives the output signals of the sensor 29 which detects an intake pressure in the intake pipe, the sensor 36 which detects the displaced stroke of the accelerator pedal 34 and a band-pass filter 52. The band-pass filter 52 receives an analog signal from the microphone 37, and passes the frequency (2~40Hz) occurred at the intermittent fuel combustion at a low engine speed and a higher harmonic frequency thereof. The CPU 41, a microprocessor, then compares the received information, through a bus 47, against any stored information, and issues an output to the D/A 44 which then subsequently outputs the appropriate instructions to the regulator valve 15 and the flow control valve 24.

Figure 1:
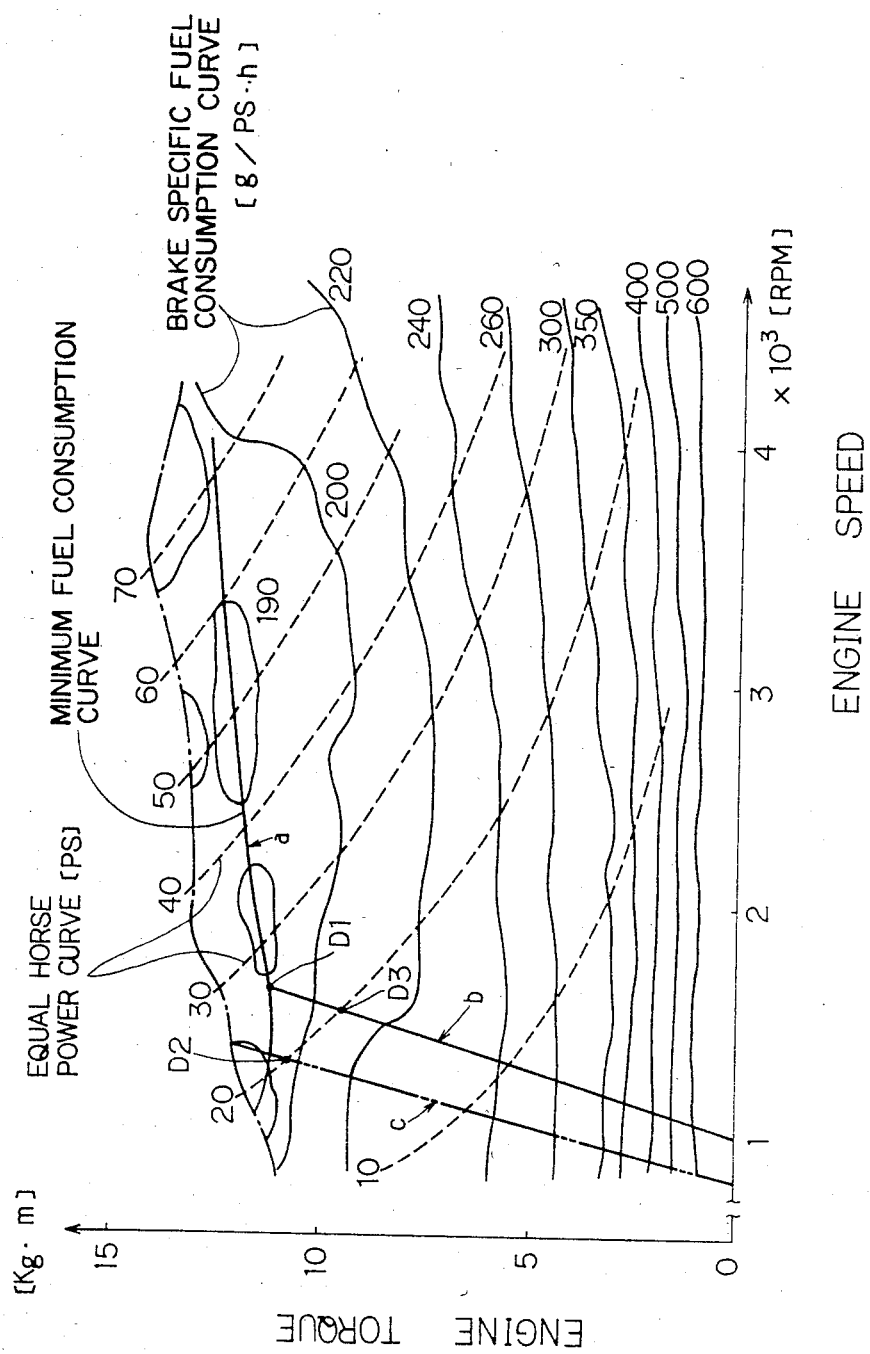
FIG. 1 is a graph illustrating a relationship between an engine torque and an engine speed (RPM)
Figure 5:
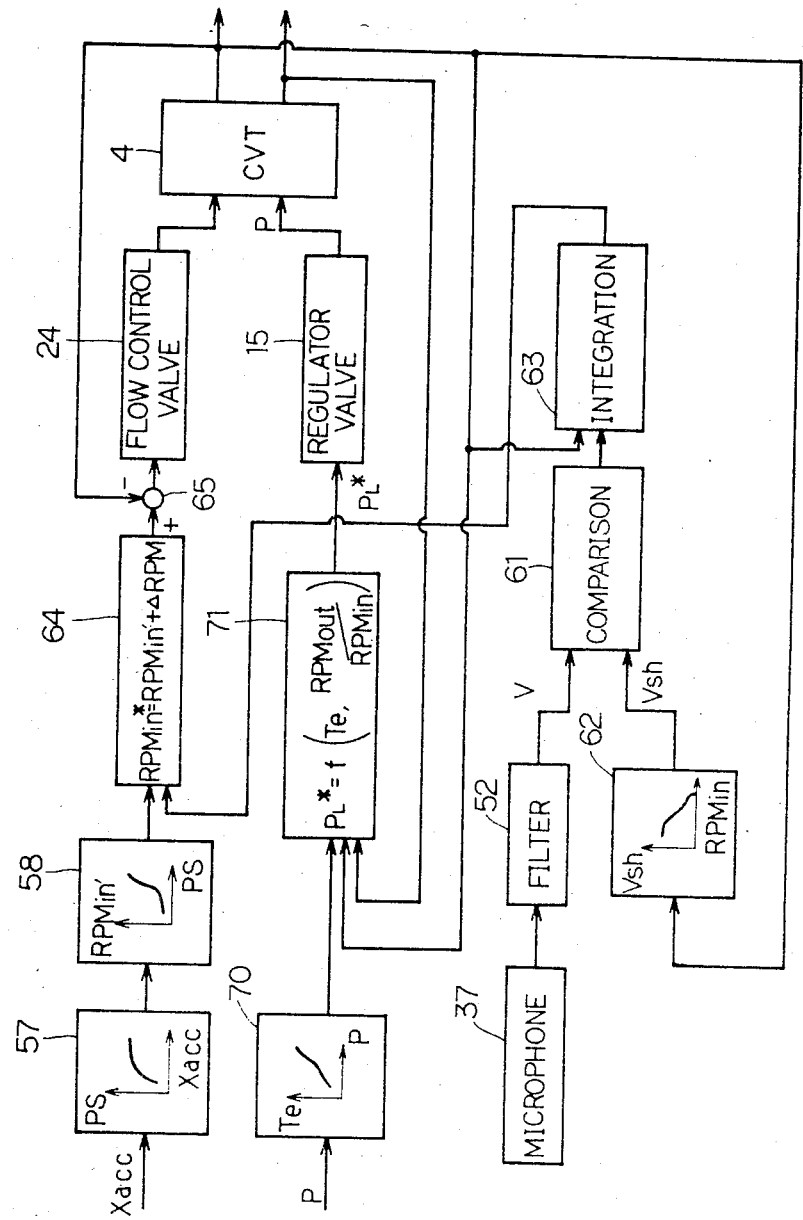
FIG. 5 is a block diagram showing an electronic operation employed in the continuously variable transmission according to the present invention.

FIG. 5 illustrates a block diagram which shows an electronic operation employed in the CVT according to the present invention. In a block 57, the displaced stroke signal Xacc of the accelerator pedal 34 is detected, and the required horse power PS corresponding to the stroke Xacc is calculated. The required horse power PS is determined in such a way as the horse power is a function as to the accelerator pedal stroke Xacc. The program proceeds to a block 58. In the block 58, a desired engine speed RPMin' is calculated from the required horse power PS. The desired engine speed RPMin' is defined to be a curved line which is substantially the same as the curves "a" and "c" shown in FIG. 1.

The output of the sensor 37 is inputted through the filter 52 to a block 61. The filter 52 passes the basic frequency of the engine, which is the number of combination strokes per second, as well as a higher harmonic frequency which corresponds to the basic frequency either multiplied or divided by an integer. Thus, a signal V corresponding to noise in a passenger compartment is inputted to the block 61. In a block 62, a basic sound signal Vsh, which is a function of to the engine speed RPMin, is calculated. when the engine speed RPMin increases, the basic sound signal Vsh is inclined to decrease. When the engine speed RPMe (=RPMin) decreases, the noise level in the passenger compartment inversely increases. The basic sound signal Vsh is defined to be an appropriate value which is experimentally determined. The output Vsh of the block 62 is inputted into the block 61. In the block 61, a comparator compares the actual sound signal V supplied through the filter 52 with the basic sound signal Vsh. Next, the program proceeds to a block 63. In the block 63, the compensated engine speed ΔRPM is calculated from the output of the block 61 from the following procedures. When the actual sound signal V is equal to or more than the basic sound signal Vsh, the compensated engine speed ΔRPM is determined to have a value calculated by the formula (ΔRPM+K1). Contrary to this, when the sound-signal V is lower than the basic actual sound signal Vsh, the compensated engine speed ΔRPM is determined to have a value calculated by the formula (ΔRPM−K2). Hence, K1 and K2 are functions of the engine speed RPMin, and both of them are positive numbers. The compensated engine speed ΔRPM is selected to be equal to or more than zero. Next, the program proceeds to the block 64. In the block 64, (RPMin'+ΔRPM) is substituted a desired engine speed for RPMin*. Next, the value (RPM*−RPMin) is selected and, this value (RPM*−RPMin) is inputted into the flow control valve 24. When the undesirable noise in the passenger compartment increases, the value (V−Vsh) becomes equal to or more than zero, and the compensated engine speed ΔRPM increases. As a results, the engine speed RPMe (=RPMin) increases, resulting in the decrease of the undesirable noise. When the engine rotates at a higher speed than a predetermined minimum engine speed, the value (V−Vsh) becomes less than zero, resulting in the decrease of the compensated engine speed ΔRPM. Hence, the engine speed RPMe decreases. Thus, the engine rotates at the minimum engine speed within the limited zone where the level of the undesirable noise in a passenger compartment is acceptable. As the compensated engine speed RPM is selected to be equal to or more than zero, the desired engine speed RPMin* becomes equal to or more than RPMin', thereby limiting the lower limit of RPMin. The undesirable noise in a passenger compartment impairs a passenger's comfort and causes passenger fatigue. It is possible to obtain the minimum engine speed in view of the longitudinal acceleration of a vehicle without undesirable noise in the passenger compartment. In this case, sensors for detecting a vibration and an acceleration of a vehicle may be provided instead of a sound sensor. A displacement sensor for detecting the vibration of an engine and a transmission may be provided in order to obviate the bad influence generated by the intermittent combustion of an engine. The output signal of the displacement sensor is compared with the basic sound signal Vsh. The displacement sensor may be replaced by a sensor for detecting a load applied to a mounting structure of an engine or a transmission, or for detecting a strain of a mounting structure of an engine or a transmission. The line pressure $P_L$ is controlled by following manner: In FIG. 5, block 70, an engine torque Te is calculated from the relation between an engine torque and a pressure in an intake pipe. The pressure in an intake pipe is detected by the intake pressure sensor 29. The program proceeds to a block 71. In the block 71, the desired line pressure $P_L^*$ is calculated by following equation:

$$P_L^* = K3 \cdot Te \, (RPMout/RPMin)$$

where, K3 is constant, and Te is an engine torque.

Hence, the desired line pressure $P_L^*$ is in proportion to an engine torque. This signal of the desired line pressure ($P_L^*$) is supplied to the regulator valve 15.

Figure 6:
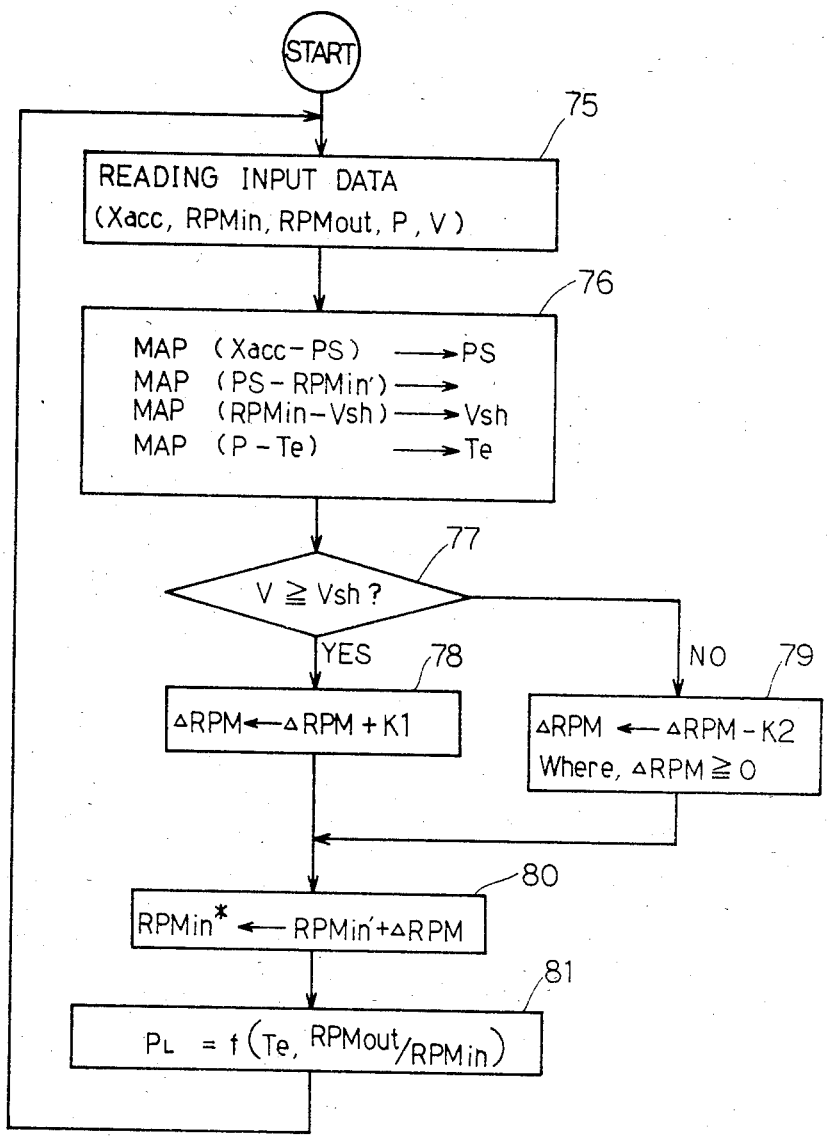
FIG. 6 is a flow chart of an electronic operation employed in continuously variable transmission according to the present invention.

FIG. 6 shows a flow chart of an electronic operation employed in the transmissions according to the present invention. In a step 75, the input data is read, such as the displaced stroke Xacc of an accelerator pedal 34, the rotating speed RPMin of the driving pulley, the rotating speed RPMout of the driven pulley, the intake pressure P in the intake pipe and the undesirable noise V in a passenger compartment. The program proceeds to a step 76. In the step 76, the required horse power PS, the desired engine speed RPMin', the basic sound signal Vsh and the engine torque are calculated form the maps Xacc-PS (shown in the block 57 in FIG. 5), PS-RPMin' (shown in the block 58 in FIG. 5), RPMin-Vsh (shown in the block 62 in FIG. 5), and P-Te (shown in the block 70 in FIG. 5), respectively. The program proceeds to a step 77. In the step 77, it is determined whether the level of the actually detected sound signal V is equal to or more than that of the basic sound signal Vsh. If the level of the actual sound signal V is equal to or more than that of the basic sound signal Vsh, the program proceeds to a step 78. Contrary to this, if the level of the signal V is less than the level of the basic signal Vsh, The program proceeds to a step 79. In the step 78, the compensated engine speed ΔRPM is replaced by the value (ΔRPM+K1). In the step 79, the compensated engine speed ΔRPM is replaced by the value (ΔRPM−K2). The compensated engine speed ΔRPM is selected to be equal to or more than zero. Next, the program proceeds to a step 80. In the step 80, the value, (RPMin'+ΔRPM), is substituted for the desired engine speed RPMin*. As a result of te program in the step 80, the engine speed is controlled to be equal to the desired engine speed RPMin*. Finally, the program proceeds to a step 81. In the step 81, the line pressure $P_L$ is calculated from the value of an engine torque Te and the ratio of (RPMout/RPMin).

Thus, the engine speed is controlled to be as small as possible while keeping the undesirable noise in the passenger compartment to an acceptable level.

While the present invention has been described in its preferred embodiment, it is to be understood that the invention is not limited thereto, and may be otherwise embodied within the scope of the following claims.

What is claimed is:

1. A continuously variable transmission means for controlling a speed of an engine installed in a vehicle, comprising:
    a driving pulley including a fixed member and a movable member, said movable member being actuated by an hydraulic cylinder to form a V-shaped opening between the fixed and movable member;
    a driven pulley with another fixed member and another movable member, said another movable member being actuated by another hydraulic cylinder to form another V-shaped opening between said another fixed member and said another movable member;
    a flexible endless belt member spanning the pulleys such that the diameter of the pulleys can be varied relative to each other to result in different transmitting ratios;
    a throttle means for controlling an engine speed;
    a detecting means for detecting a basic frequency and a higher harmonic frequency of the engine in accordance with an operating condition of the engine;
    a storing means for storing a predetermined basic value;
    a comparison means for comparing the detected frequency with the stored predetermined basic value; and
    a control means for controlling the engine speed in response to said comparison means comparing the detected frequency with the stored basic value and thereafter changing the transmitting ratio between the driving and driven pulleys.

2. The continuously variable transmission means of claim 1, wherein the engine speed increases when the frequency detected by the detecting means is greater than the predetermined basic value.

3. The continuously variable transmission means of claim 1, wherein the engine speed decreases when the frequency detected by the detecting means is less than the predetermined basic value.

4. The continuously variable transmission means of claim 1, wherein the predetermined basic value is a function of engine speed based upon experiment.

* * * * *